United States Patent
Agarwal

(10) Patent No.: US 9,210,067 B1
(45) Date of Patent: Dec. 8, 2015

(54) METHOD AND APPARATUS FOR EXCHANGING ROUTING INFORMATION

(75) Inventor: Amit Agarwal, Fremont, CA (US)

(73) Assignee: Google Inc., Mountain View, CA (US)

( * ) Notice: Subject to any disclaimer, the term of this patent is extended or adjusted under 35 U.S.C. 154(b) by 1936 days.

(21) Appl. No.: 12/171,717

(22) Filed: Jul. 11, 2008

(51) Int. Cl.
*H04L 12/751* (2013.01)
*H04L 12/707* (2013.01)

(52) U.S. Cl.
CPC ............... *H04L 45/02* (2013.01); *H04L 45/22* (2013.01)

(58) Field of Classification Search
USPC .......................................... 709/207, 220, 223
See application file for complete search history.

(56) References Cited

U.S. PATENT DOCUMENTS

| | | | | |
|---|---|---|---|---|
| 6,496,510 B1* | 12/2002 | Tsukakoshi et al. | ........... | 370/401 |
| 6,721,907 B2* | 4/2004 | Earl | ............... | 714/57 |
| 6,801,496 B1* | 10/2004 | Saleh et al. | ................. | 370/221 |
| 7,006,431 B1* | 2/2006 | Kanekar et al. | ............... | 370/217 |
| 7,362,700 B2* | 4/2008 | Frick et al. | .................... | 370/219 |
| 7,362,709 B1* | 4/2008 | Hui et al. | ....................... | 370/237 |
| 7,391,730 B1* | 6/2008 | Chandra et al. | .............. | 370/236 |
| 7,463,654 B2* | 12/2008 | Riegel et al. | .................. | 370/503 |
| 7,490,161 B2* | 2/2009 | Ren | ............... | 709/238 |
| 7,496,644 B2* | 2/2009 | Shand et al. | ................. | 709/221 |
| 8,014,278 B1* | 9/2011 | Subramanian et al. | ....... | 370/229 |
| 2003/0056138 A1* | 3/2003 | Ren | .................... | 714/4 |
| 2003/0067925 A1* | 4/2003 | Choe et al. | .................... | 370/400 |
| 2004/0001485 A1* | 1/2004 | Frick et al. | .................... | 370/389 |
| 2004/0246902 A1* | 12/2004 | Weinstein et al. | ............. | 370/238 |
| 2005/0111349 A1* | 5/2005 | Vasseur et al. | ................. | 370/216 |
| 2005/0135357 A1* | 6/2005 | Riegel et al. | ................. | 370/389 |
| 2007/0036178 A1* | 2/2007 | Hares et al. | .................... | 370/490 |
| 2008/0037562 A1* | 2/2008 | Saleh et al. | .................... | 370/400 |
| 2009/0046579 A1* | 2/2009 | Lu et al. | ......................... | 370/225 |
| 2009/0129398 A1* | 5/2009 | Riegel et al. | .................. | 370/401 |
| 2009/0316570 A1* | 12/2009 | Bell | ............................. | 370/218 |
| 2013/0297757 A1* | 11/2013 | Han et al. | ...................... | 709/222 |

FOREIGN PATENT DOCUMENTS

EP 447725 A2 * 9/1991 ............. G06F 15/16

* cited by examiner

*Primary Examiner* — Backhean Tiv
(74) *Attorney, Agent, or Firm* — Edward A. Gordon; Foley & Lardner LLP

(57) ABSTRACT

During operation, a client node can receive a network's topology. Next, the client node can detect a change in an interface's state. The client node can then create an interface state change message which indicates the change in the interface's state. Next, the client node can send the interface state change message to the master node, which can cause the master node to notify other client nodes about the change in the interface's state. If a client node's copy of the link state database (LSD) is out of sync with the master node's LSD, the client node can request the master node to send a full LSD update message to the client node. The master node can multicast messages to the client nodes, and each node in the network can include one or more interfaces that are dedicated for sending and receiving control messages, thereby creating a separate control network.

20 Claims, 4 Drawing Sheets

NETWORK 100

| | | | |
|---|---|---|---|
| 202 | 204 | 206 | 208 |
| 210 | | 212 | 214 |
| 216 | 218 | 220 | |
| 222 | | | |
| 224 | | | |
| 226 | | | 228 |
| 230 | | 232 | |

METHOD AND APPARATUS FOR EXCHANGING ROUTING INFORMATION

FIELD OF THE INVENTION

The present invention generally relates to communication networks. More specifically, the present invention relates to methods and apparatuses for exchanging routing information.

BACKGROUND

Related Art

Communication networks have transformed the way we live our lives. However, there are a number of networking problems which have not been solved adequately.

Quickly detecting and rerouting traffic around network failures is one such problem. Today's networks have link speeds of tens of gigabits per second, and these speeds are expected to increase rapidly as high bandwidth video and audio applications become more popular. At such high link speeds, the amount of data that is lost per second due to a network failure can be enormous. Further, networks are increasingly being used for mission critical business applications which makes it even more important to reduce the time it takes for a network to recover from a failure.

Unfortunately, conventional routing protocols can be cumbersome to use, and can take too long to detect and reroute traffic around network failures. Hence, it is desirable to reduce the time it takes to detect and reroute traffic around network failures.

SUMMARY

One embodiment of the present invention provides a routing protocol which can quickly detect and reroute traffic around network failures. The network can include a master node and two or more client nodes. The master node can maintain a link state database (LSD), and the client nodes can store copies of the LSD. The client nodes can receive LSD update messages from the master node which can enable the client nodes to keep their copies of the LSD in sync with the master node's LSD. The client nodes can use their copies of the LSD to determine forwarding tables. In one embodiment, if a client node detects that the master node is down, the client node flushes its forwarding table and starts dropping traffic.

In one embodiment, network nodes do not perform network discovery. Instead, network nodes receive the network's topology, e.g., by reading a configuration file during boot-up. The network's topology can include information about how links and nodes in the network are coupled together. However, the network's topology usually does not include state information of links and nodes in the network.

During operation, a client node can detect a change in an interface's state. The client node can then create an interface state change message which indicates the change in the interface's state. Next, the client node can send the interface state change message to the master node. The master node can then notify other client nodes about the change in the interface's state, which can enable the client nodes to update their copies of the LSD.

Specifically, the master node can update the LSD using the interface state change message, and multicast an incremental LSD update message to client nodes. The client nodes can use the incremental LSD update message to update their copies of the LSD and recompute the forwarding tables. Note that the incremental LSD update message can act as an implicit acknowledgment for the interface state change message.

In some embodiments, LSD update messages can be UDP (User Datagram Protocol) packets which are received using IPv4 (Internet Protocol version 4) multicasting or IPv6 (Internet Protocol version 6) multicasting.

In some embodiments, each node in the network can include one or more interfaces which are dedicated for sending and receiving control messages, thereby creating a separate control network for carrying control traffic.

In some embodiments, if a client node's copy of the LSD is out of sync with the master node's LSD, the client node can request the master node to send a full LSD update message to the client node. The full LSD update message can include information about only those links that are down. The links whose information is not included in the full LSD update message are assumed to be up.

In some embodiments, the master node sends the full LSD update message in a single UDP packet. If the full LSD update message does not fit in a single UDP packet, the master node may decide to defer sending the full LSD update message. Once there are fewer "down" links in the network, the full LSD update message may fit in a single UDP packet, and the master node may decide to send the full UDP update message.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Network

Figures 1, 2:
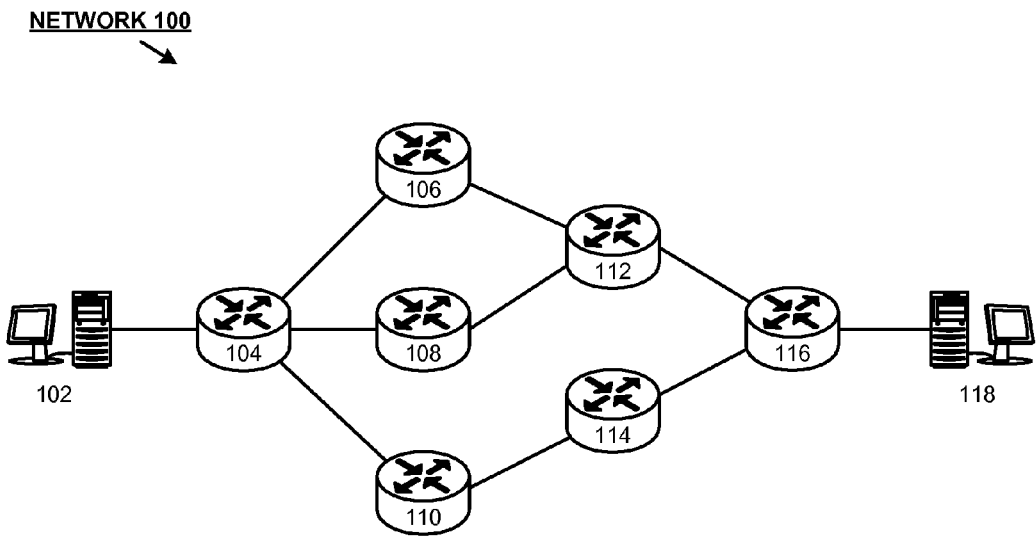
FIG. 1 illustrates a network in accordance with an embodiment of the present invention.
FIG. 2 illustrates a packet in accordance with an embodiment of the present invention.

FIG. 1 illustrates a network in accordance with an embodiment of the present invention.

A network can generally include network nodes which are coupled together using wired or wireless communication channels. This includes, but is not limited to, a local area network, a wide area network, or a combination of networks. In one embodiment, a network can include the Internet.

For example, network 100 comprises hosts 102 and 118, and routers 104, 106, 108, 110, 112, 114, and 116. The routers in the network can be coupled using wired or wireless communication channels to form an arbitrary mesh topology. Embodiments of the present invention are not limited to the topology, technology, or architecture of network 100.

A network node (or "node" for short) can generally include any system capable of communicating with other systems via a network. This includes, but is not limited to, a computer system based on a microprocessor, a mainframe computer, a printer, a router, a personal organizer, or a mobile phone. For example, the hosts and routers shown in FIG. 1 are network nodes. We use the terms "router" and "switch" interchangeably.

In one embodiment of the present invention, a network includes two types of nodes: master nodes and client nodes. This is different from conventional packet switched networks which typically include only one type of node, namely, routers.

The network can include one master node, and two or more client nodes. Alternatively, the network can include one primary master node, and one or more standby master nodes. During normal operation, the primary master node is active and performs all of the operations that the master node is supposed to perform. When the primary node fails, a standby master node becomes active and takes over the responsibilities of the failed primary master node. If the standby master node fails, another standby master node may take over the duties from the failed standby master node.

Once the primary master node becomes active, it may take over the responsibilities from the standby master node. Alternatively, the primary master node may not take over the responsibilities from the standby master node; instead, the primary master node may become a standby master node which may become active when the standby master node, which is currently active, fails.

Packet

In packet switched networks, nodes use packets to communicate with one another. A packet usually includes a header section which typically contains source and destination address information, and a payload section which usually contains the data that is being communicated. The packet may also include a trailer section which can contain an error checking code.

Communication can be accomplished using a layered software architecture, which is often referred to as a networking stack. A layer in the networking stack is usually associated with a set of protocols which define the rules and conventions for processing packets in that layer.

Each layer performs a service for the layer immediately above it to help with processing packets, and each layer typically has its own header which it uses to communicate with its peer on the other node. At the sender, each layer adds its header as the payload moves from higher layers to lower layers. The receiver generally performs the reverse of this process by stripping headers at each layer as the packet moves from the lowest layer to the highest layer.

FIG. 2 illustrates a packet in accordance with an embodiment of the present invention.

Packet 200 is an Internet Protocol version 4 (IPv4) packet whose header includes a number of fields, such as, version 202, header length 204, type of service 206, total length 208, identification 210, flags 212, fragment offset 214, time to live 216, protocol 218, header checksum 220, source address 222, and destination address 224. The header can additionally include options field 226 and padding 228.

A header for another layer, e.g., UDP (User Datagram Protocol), may follow the IPv4 header. For example, the UDP header may include source port number 230 and destination port number 232. After the various headers, the packet may contain the payload. The packet shown in FIG. 2 is for illustration purposes only, and is not intended to limit the present invention. Specifically, embodiments of the present invention can be used in any packet switched network including an IPv6 network.

Router

As a packet traverses the network from the source system to the destination system, it may pass through one or more routers, which are typically coupled to form an arbitrary mesh topology. Each router typically uses information in a packet's header to determine how to forward the packet.

Figure 3:
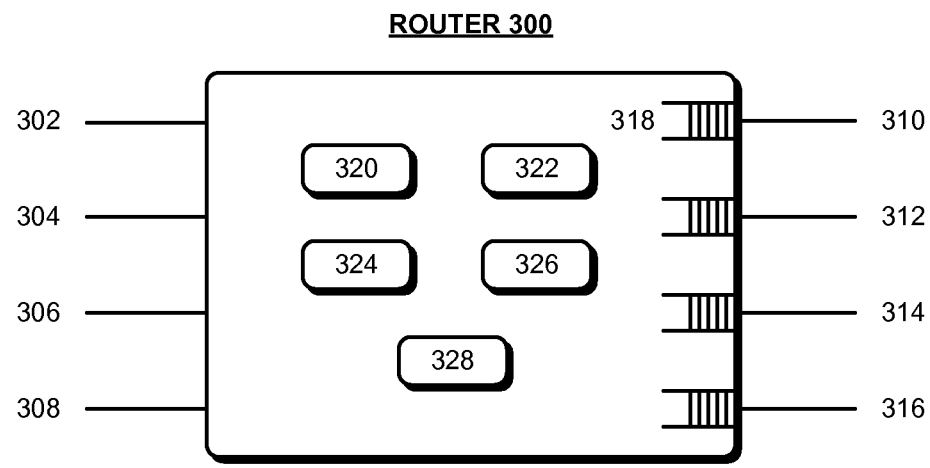
FIG. 3 illustrates a router in accordance with an embodiment of the present invention.

FIG. 3 illustrates a router in accordance with an embodiment of the present invention.

Router 300 may receive packets via its input ports, e.g., ports 302, 304, 306, and 308, and send them via its output ports, e.g., ports 310, 312, 314, and 316. A router usually includes hardware and/or software to determine how to forward packets. For example, router 300 can include queue 318, processor 320, RAM (Random Access Memory) 322, TCAM (Ternary Content Addressable Memory) 324, ASIC (Application Specific Integrated Circuit) 326, and flash memory 328. These components can be coupled using a bus or a switch.

Flash memory 328 may store the router's configuration and software, which may be loaded into RAM 322 during boot-up. Processor 320 may be used to execute routing protocol software and network management software. ASIC 326 may be used to process information in a packet's header, and TCAM 324 may be used to perform routing-table lookups. The router may use queues, e.g., queue 318, to store packets while they are waiting to be processed, or while they are waiting to be sent via an output port.

FIG. 3 has been presented only for purposes of illustration, and is not intended to limit the present invention. Many modifications and variations will be apparent to practitioners skilled in the art. For example, a router may include multiple line cards which may be coupled via a backplane, and each line card may have its own hardware and software. A router may also include a network processor which executes instructions for processing packets.

Routine Protocol

A routing protocol is a process by which nodes in a network exchange routing information. Nodes use the routing information to determine how to route messages through the network. For example, the routing information can include link status information which can enable routers to determine how to forward packets.

An embodiment of the present invention uses a hybrid routing approach which uses some aspects of a centralized approach and some aspects of a distributed approach. The embodiment is "centralized" in the sense that the network state is kept at a central location, namely, the master node. The embodiment is "distributed" in the sense that the routing table computation is performed independently by each client node.

Specifically, a node called the master node is responsible for maintaining the link state database (LSD). All other nodes, called client nodes, send information about interface state changes to the master node which updates the LSD accordingly. The master node then multicasts or broadcasts the LSD update messages to the client nodes. When the client nodes receive the LSD update messages from the master node, the client nodes update their copy of the LSD, and use the updated copy to compute the forwarding tables. Once the forwarding tables are computed, the client nodes configure the hardware accordingly.

Some routing protocols, e.g., Open Shortest Path First (OSPF), store the entire network state at each node. In these protocols, each copy of the network state is equally authentic, i.e., none of the nodes in the network stores a "master" copy that has a special status. In contrast, an embodiment of the present invention stores a "master" copy of the network state at the master node. This copy is the only copy that is "authentic."

Other routing protocols, e.g., Distance Vector Routing Protocol (DVRP), do not store the entire network state at any of the nodes. In contrast, embodiments of the present invention store the entire network state at the master node, and each client node tries to keep its copy of the network state in sync with the master node's copy.

In an embodiment of the present invention, each client node reads the network topology during boot-up. The network topology can be stored on a configuration file that is accessible to the routers. Alternatively, the routers can request a server to send them the network topology. This is in contrast to conventional routing protocols that perform topology discovery by exchanging discovery messages with their neighbors.

Further, in one embodiment, each node in the network performs its own shortest path computation to generate forwarding tables. This is in contrast to centralized approaches where the shortest path computation is performed at a central location which is then disseminated to other nodes in the network.

Another use of routing protocols is to ascertain the state of the network. For example, a network administrator may want to know whether the network nodes and links are performing as desired or whether some nodes and/or links need to be repaired. Some conventional approaches achieve this by querying the state of each node to determine the overall state of the network. However, querying each node in the network can be costly. An embodiment of the present invention is a routing protocol which maintains the current state of the network at a central location, namely the master node. This enables a user to quickly determine the state of the network by querying the master node.

Another advantage of storing the master copy of the LSD at the master node is that the master node can freeze the LSD in response to a user request. This can enable the user to ensure that the LSD does not change while the user modifies the network configuration.

Event and Message Handling at a Client Node

Interface State Change Events

A client node can configure its software so that an interface state change event is generated when the state of a link changes at the client node. When an interface state change event is generated, the client node can send a message to the master node to inform the master node about the interface state change event. The client node can start a retry timer when the client node sends the message, and the client node can resend the message if the timer expires before the client node receives an implicit or explicit acknowledgment from the master node. If the timer expires, the client node can restart the timer with an exponentially increasing timer interval.

The master node registers with the client nodes to receive messages from the client nodes. If a master node has not registered with the client node, the client node can ignore interface state change events. A misbehaving or flapping interface could generate a large number of interface state change events, which can cause a large number of messages to be sent to the master node. In one embodiment, the client node does not throttle the messages that the client node sends to the master node; instead, the client node throttles the interface state change events themselves, i.e., the client node stops generating interface state change events for misbehaving or flapping interfaces.

Receiving an Incremental LSD Update Message

When a master node receives an update message from a client node, the master node sends an incremental update message to all client nodes in the network. The master node also sends the current version number of the LSD with the incremental update message. The version number enables a client node to determine whether the client node can use the incremental update message to update the client node's copy of the LSD.

For example, suppose a client node receives an incremental update message from the master node, and suppose the message indicates that the current version of the LSD at the master node is k. Further, let us assume that the LSD at the client node is valid, and the version number is j. In this scenario, the client node will apply the incremental update if $k=(j+1) \bmod \text{LSDVersionMax}$, where LSDVersionMax is the maximum value for the LSD version number after which the version number wraps around to 0, and "mod" is the modulo operation. After the client node updates its copy of the LSD, the client node changes its LSD version number to k. The client node may compute the routing tables based on the updated LSD, and it may also compute a checksum for the LSD.

On the other hand, if the client node's LSD is invalid, or if the client node's LSD is valid but $k \neq (j+1) \bmod \text{LSDVersionMax}$, the client node concludes that its LSD is not synchronized with the master node's LSD. The client node can then request the master node to send the full LSD instead of an incremental update.

Receiving a Full LSD Update Message

If a client node receives a full LSD update message, the client node can clear its LSD and update the cleared LSD using the full LSD update message. The full LSD update message is an LSD update message that provides link state updates for all the links in the network. In one embodiment, links are assumed to be "up" by default, and the full LSD update message only includes a link's status if the link is "down." For example, when the client node clears its LSD, it can set all links in the LSD to the "up" state. Next, for each link specified in the full LSD update message, the client node can set the link status to "down." Once the client completes processing of the full LSD update message, it can compute new routing tables based on the updated LSD, set the version number of the LSD to the appropriate value, and compute a checksum for the updated LSD.

Receiving a "Hello" Message

The master node periodically sends a "hello" message to all the client nodes. The master node can multicast or broadcast the "hello" message to all the client nodes. When a client node receives a "hello" message from a master node, the client node registers the master node if the master node has not been registered as yet, or if the master node is different from the one that is currently registered with the client node. Once the master node is registered, the client node can start sending link update messages to the master node.

The "hello" message can include the current version number of the master node's LSD, and it can also include the checksum of the master node's LSD. When a client node receives a "hello" message, it compares the LSD version number in the "hello" message with its own LSD version number, and it can also compare the checksum in the "hello" message with its own checksum. The client node may not compute the checksum each time it receives a "hello" message; instead, the client node may compute the checksum on a periodic basis and use this pre-computed checksum when it receives a "hello" message.

If the LSD version numbers match and the LSD checksums also match, the client node concludes that its LSD is synchronized with the master node's LSD. The client node can then send a "hello reply" message to the master node with the client node's LSD version number. If the network has a large number of client nodes, the master node may receive a large number of "hello reply" messages at the same time, which can cause congestion. To prevent this, the client node can start a timer with a random interval value, and send the "hello reply" message when the timer expires. The random interval timer can help spread out the "hello reply" messages over a time interval.

The client node can compare the current state of its interfaces with the states that are stored in the LSD. If the current interface states are different from those stored in the LSD, the client node can include the current interface states in the "hello reply" message.

If the client node determines that the LSD version numbers don't match or that the LSD checksums don't match, the client node concludes that its LSD is not synchronized with the master node's LSD. The client node can then send a request message to the master node to request the master node to send a full LSD update message to the client node.

Event and Message Handling at a Master Node

Receiving Interface State Change Messages

When a master node receives an interface state change message from a client node, the master node can start a timer (unless the timer is already running) to wait for other interface update messages. When the timer expires, the master node updates the LSD using all the interface state change messages it received while the time was running. If the LSD version number is j, the master node sets the LSD version to (j+1) mod LSDVersionMax, which becomes the current LSD version number.

Next, the master node sends an incremental LSD update message to all the client nodes and the master node starts a timer. The master node will not send any more LSD update messages until the timer expires. The incremental LSD update message includes information about the interface state changes that the master node used while creating the current version of the LSD. As noted above, the master node can send the incremental update message to all the client nodes using unicast, multicast, or broadcast packets.

A low timer value can cause the master node to send too many incremental update messages to the client nodes. A high timer value can cause the incremental update messages to be sent after a large delay. Hence, it may be desirable to choose a timer value that enables the master node to process multiple interface state change events without delaying the incremental update message too much.

Sending Full LSD Update Messages

When a master node receives a request from a client node to send a full LSD update message, the master node sends the full LSD update message to the client node. In one embodiment, the full LSD update message includes those link state updates which are different from a "default" state. Specifically, a client node can assume that all links in the network are in a "default" state. The full LSD update message only specifies the links whose state is different from this "default" state. This technique can reduce the size of the full LSD update message.

Sending "Hello" Messages

The master node periodically sends "hello" messages to the client nodes. The "hello" message acts as a "keepalive" message for the client nodes because if the master node does not receive a reply from a client node, the master node determines that the client node has failed. For example, the master node may determine that a client node has failed if the client node fails to respond before a time expires and/or if the client node fails to respond to consecutive "hello" messages. The "hello" message also helps to synchronize the client nodes' LSDs with the master node's LSD because the "hello" messages include the current LSD version number.

If the master node receives a "hello reply" message from a client node before a timer expires, the master node can determine that the client node is alive. If the "hello reply" message includes information about interface state changes, and if the LSD version number in the "hello reply" message is equal to the current LSD version number, the master node updates the LSD using the information about the interface state changes and marks the LSD as "dirty." After the expiry of a timer, the master node sets the LSD's version number to (j+1) mod LSDVersionMax, where j is the current LSD version number. The master node then sends an incremental LSD update message to the client nodes.

LSD Synchronization

The LSD of the master node can become out of sync with the LSD at a client node if an incremental LSD update message is lost. Further, the client node's LSD is unsynchronized with the master node's LSD when the client node boots-up.

The master node periodically sends a "hello" message to all client nodes with the LSD version number. The client node can use the version number specified in the "hello" message to determine whether its LSD is synchronized with the master node's LSD. If the LSD is out of sync, the client node can request the master node to send a full LSD update message. When the client node receives the full LSD update message, its LSD will be in sync with the master node's LSD.

The LSD can also become out of sync if an interface state change message that is sent by a client node is lost. After sending the interface state change message to the master node, the client node can start a timer to wait for the master node to acknowledge receiving the interface state change message. For example, the master node implicitly acknowledges receiving the interface state change message from the client node when it sends an incremental update message that includes the client node's interface state change. If the client node's timer expires before it receives an acknowledgment from the master node, the client node can resend the interface state change message. The timer value can be exponentially increased if the timer expires multiple times.

When a client node receives the periodic "hello" message, it may notice that the master node did not receive the interface state change message. The client node can then send the interface state change information in the "hello reply" message. In response to receiving the "hello reply" message, the master node can update its LSD, and send an incremental LSD update message to client nodes, thereby implicitly acknowledging that it received the interface state change message.

If the client node's LSD becomes corrupted, e.g., due to a memory error, the LSD can become out of sync with the master node's LSD. Note that the master node sends the LSD checksum in the "hello" messages. The client node can periodically compute a checksum of its LSD and compare the checksum with the checksum it receives from the master node in the "hello" message.

If the client node's checksum does not match the master node's checksum, the client node can send a request message to the master node to request a full LSD update message. Once the client node receives the full LSD update message, it can clear the LSD and apply the full LSD update message to the cleared LSD to obtain an LSD that is in sync with the master node's LSD.

Another scenario where the LSDs can become out of sync is when the master node is rebooted due to a malfunction or error. The master node resets its LSD and sends a "hello" message to all the client nodes. When the client nodes receive the "hello" message, they realize that their LSD is out of sync with the master node's LSD. For example, the master node may advertise its LSD as being invalid, or it may set the version number of its LSD to an initial value that is guaranteed to be different from the version number of the client node LSDs. In either case, the client nodes will realize that their LSDs are out of sync with the master node's LSD. The client nodes can then send information about interface state changes in their "hello reply" messages to the master node. Once the master node processes all the "hello reply" messages, its LSD will accurately represent the link states in the network. The master node can then send one or more incremental LSD update messages to the client nodes. Alternatively, the master node can send a full LSD update message to the client nodes. In either case, once the client nodes process the update LSD messages, the master node's LSD will be in sync with the client node LSDs.

Exchanging Information Between Interior and Exterior Routine Protocols

Large networks are typically composed of smaller networks. The routing protocol that is used within each smaller network is sometimes called an interior routing protocol, and the routing protocol that is used between the smaller networks is sometimes called an exterior routing protocol. One embodiment of the present invention can be used as an interior routing protocol. An interior routing protocol can exchange routing information with exterior routing protocols. For example, an embodiment of the present invention can import routes from an exterior routing protocol such as BGP (Border Gateway Protocol).

Specifically, a router can execute an interior routing protocol as well as an exterior routing protocol. Next, the router can import routes from the exterior routing protocol to the internal routing protocol. The router can then use the interior routing protocol to inform other routers about the imported routes.

Equal Cost Multi-Path

One embodiment of the present invention can determine multiple equal cost paths to a destination node if they exist. In addition to storing the multiple paths, the embodiment can also store the number of equal cost paths to each destination. Note that two paths are different from one another if they differ in at least one link or node. Equal cost paths can help to distribute the network load which can reduce link congestion and which can increase network utilization.

Security

A number of security mechanisms can be used to protect against accidental misconfiguration and malicious attacks. For example, the system can use simple or Message-Digest algorithm 5 (MD5) based authentication. In simple authentication, the password is sent in clear-text, whereas in MD5-based authentication, the password is not sent in clear-text.

For MD5-based authentication, the client nodes and the master node need to share the same password or key. In addition to these security mechanisms, the master node can be configured to drop packets from network nodes that the master node does not recognize as client nodes.

Recovery Time

Recovery time is a metric that is often used to evaluate routing protocols. Recovery time is the time from a network failure event to the time when network traffic is rerouted around the network failure. In other words, the recovery time is the time network traffic is disrupted. Clearly, it is desirable to reduce the recovery time.

Embodiments of the present invention enable a network to quickly recover from network failures. Specifically, for a link failure, the recovery time includes the following components: time to detect a link failure at a client node, time to notify the client node about the link failure, time to send a notification from the client node to the master node about the link failure, time to multicast or broadcast an LSD update message from the master node to all client nodes, time for the client nodes to compute new forwarding tables using the updated LSD, and time for the client nodes to configure the hardware using the new forwarding tables. Conventional routing protocols can take a substantial amount of time to propagate link failure information to all routers in the network. In contrast to conventional techniques, embodiments of the present invention propagate link failure information to all nodes in the network in just two hops: a notification from the client node to the master node, and a multicast or broadcast from the master node to the client nodes. When a client node reboots, the recovery time calculation is similar to the link failure case: the client node's neighbors detect the link failures, and, as explained above, the information is propagated to all the nodes in the network.

When a client node's software fails, the client node may continue forwarding traffic because a software failure doesn't necessarily cause the hardware to stop forwarding traffic. Hence, for software failures, the time for recovery should really be measured from the time the master node detects that the client node's software has failed. The recovery time for client node's software failures includes the following components: time for master node to detect that a client node's software has failed (e.g., if the master node does not receive a "hello reply" message from a client node before a timer expires, the master node may determine that the client node's software has failed), time to multicast or broadcast an LSD update message from the master node to all client nodes, time for the client nodes to compute new forwarding tables using the updated LSD, and time for the client nodes to configure the hardware using the new forwarding tables.

Traffic is not be disrupted when the master node fails. However, if a link failure occurs while the master node is down, it may take longer to propagate the link failure to the other nodes. Hence, the recovery time in this scenario depends on how quickly a standby master node can assume the responsibilities of the failed primary master node. Traffic will not be disrupted if there are no failures while the primary master node switches over to the backup master node, and hence, from a traffic rerouting perspective, the recovery time is zero.

Messaging

One embodiment uses an unreliable protocol, e.g., UDP, for exchanging messages. Note that routing messages, e.g., incremental LSD update message, full LSD update message, "hello" message, "hello reply" message, etc., are not explicitly acknowledged. However, in a variation of the embodiment, these messages can be acknowledged explicitly. In one embodiment, all routing messages are sent as UDP packets to a specific UDP port. The master node can use IP multicasting to send "hello" messages and LSD update messages to all the client nodes. Specifically, all client nodes can be members of a multicast group, and the master node can send "hello" messages and LSD update messages to this multicast address. When a node receives a message, the node may check the authentication, packet length, and/or checksum of the message before processing the message. Specifically, if the message fails any of these tests, the node may discard the message.

Exemplary Timers

An embodiment of the present invention uses multiple timers. The embodiment can use a timer to determine the frequency with which a master node sends the "hello" messages. A timer can be used to determine the amount of time the master node waits to receive replies from the client nodes before the master node sends an LSD update message to the client nodes in response to receiving interface state change information in "hello reply" messages.

The master node can use a timer to group multiple interface state change messages. For example, the master node can start a timer when it receives an interface change event from a client node. While the timer is running, the master node collects all the interface state change messages that it receives from other client nodes. When the timer expires, the master node can send an incremental LSD update message that includes the interface state change information that was received while the timer was running.

A timer can be used by the master node to ensure that it doesn't send LSD update messages too frequently. For example, the master node can start a timer when it sends an LSD update message to the client nodes. Next, the master node can wait for the timer to expire before sending the next LSD update message.

A checksum for the LSD can be computed periodically using a timer. For example, a network node can start a timer when the node computes the LSD checksum. When the timer expires, the node can repeat the computation and start the timer again.

The master node can use a timer to determine if a client node is dead. For example, a master node can start a timer when it multicasts or broadcasts a "hello" message to the client nodes. When the timer expires, the master node can check if it did not receive a "hello reply" message from a client node. If so, the master node can declare the client node to be dead. In one embodiment, this timer can be set to be equal to three times the value of the "hello" timer.

Client nodes can use a timer to determine when to send a "hello reply" message. For example, when a client node receives a "hello" message, the client node can start a timer with a random value. When the timer expires, the client node can send a "hello reply" message to the master node.

A timer can be used to determine when to resend an interface state change message to the master node. For example, a client node can start a retransmit timer when it sends an interface state change message to the master node. When the timer expires, the client node can check if it has received an implicit acknowledgment from the master node. If the client node has not received an implicit acknowledgment, the client node can resend the interface state change message, and start the timer again. The client node can exponentially increase the timer value each time it resends the interface state change message.

The client nodes can use a timer to determine if the master node is dead. For example, a client node can start a timer once it knows the identity of a master node, e.g., once the master node registers with the client node. If the client node does not receive a "hello" message from the master node before the timer expires, the client node can declare the master node to be dead and take appropriate action.

Exemplary Message Format

As explained above, embodiments of the present invention employ different types of messages to exchange routing information. The following sections provide an example of a message format that can be used for exchanging routing information.

Message Header

Figure 4:
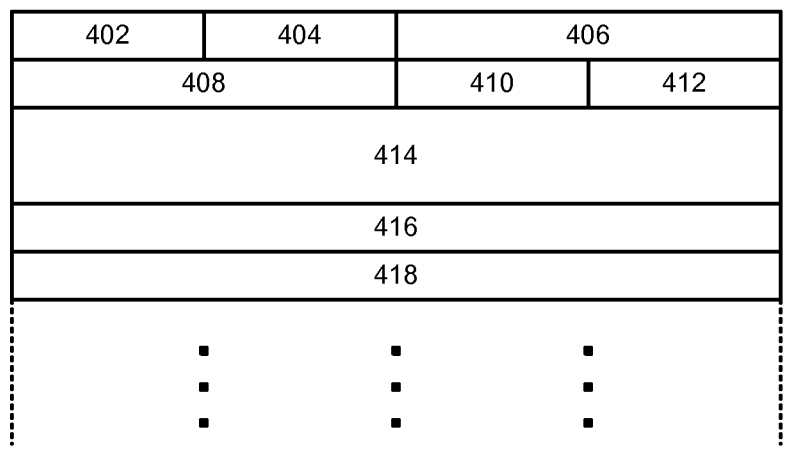
FIG. 4 illustrates a message header in accordance with an embodiment of the present invention.

FIG. 4 illustrates a message header in accordance with an embodiment of the present invention.

Message header 400 can include the following fields: version 402, type 404, message length 406, checksum 408, authentication type 410, reserved field 412, authentication 414, router identifier 416, and LSD version 418.

Version 402 can indicate the version of the routing protocol. Type 404 can indicate the message type, e.g., "hello" message, "hello reply" message, incremental LSD update message, full LSD update message, request message for requesting a full LSD update message, interface state change message, etc. Message length 406 can indicate the length of the message including the message header. Checksum 408 can be a checksum for the message. For example, the checksum can be the 16-bit one's complement of the one's complement sum of all the 16-bit words in the message. If the message's length is not an integral number of 16-bit words, the message can be padded before computing the checksum. Authentication type 410 can indicate the type of authentication that is to be used, e.g., simple, MD5, etc. Reserved field 412 can be reserved for future purposes. Authentication 414 can be used to provide authentication information. Router identifier 416 can be an identifier that can enable the message recipient to identify the message sender. For example, router identifier 416 can be the sender's IP address. LSD version 418 can be used to indicate the LSD version.

In one embodiment, all messages include the message header. The message may include additional information after the message header which can depend on the type of the message. For example, a "hello" message may not include any additional information, i.e., the "hello" message may simply be a message header with the appropriate message type. On the other hand, a full LSD update message may include a large amount of additional information. Specifically, in addition to the message header, the message may include information about the state of internal or external links. Information about a link can be specified using an LSD entry, which can have the following formats.

Internal LSD Entry Format

Figure 5:
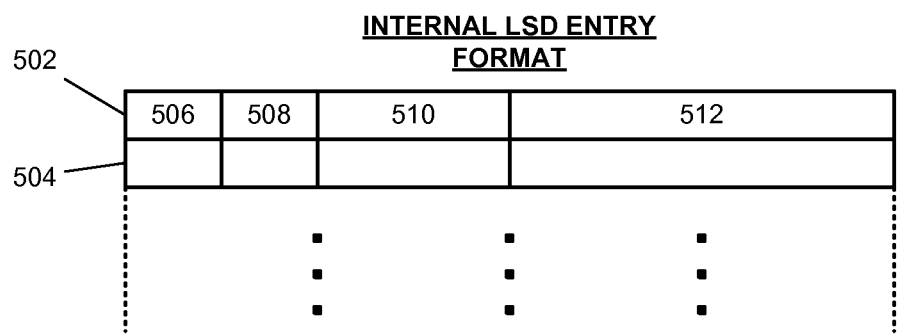
FIG. 5 illustrates internal LSD entries in accordance with an embodiment of the present invention.

FIG. 5 illustrates internal LSD entries in accordance with an embodiment of the present invention.

A message can include one or more internal LSD entries. An internal LSD entry is associated with a link in the network. For example, a message can include internal LSD entries 502 and 504. Each internal LSD entry can include the following fields: entry type 506, state 508, port 510, and node identifier 512. Entry type 506 can indicate that this LSD entry is an internal LSD entry. State 508 can indicate the state of the link. Port 510 can specify the port which is associated with the link. Node identifier 512 can identify the node which is coupled with the link.

External LSD Entry Format

Figure 6:
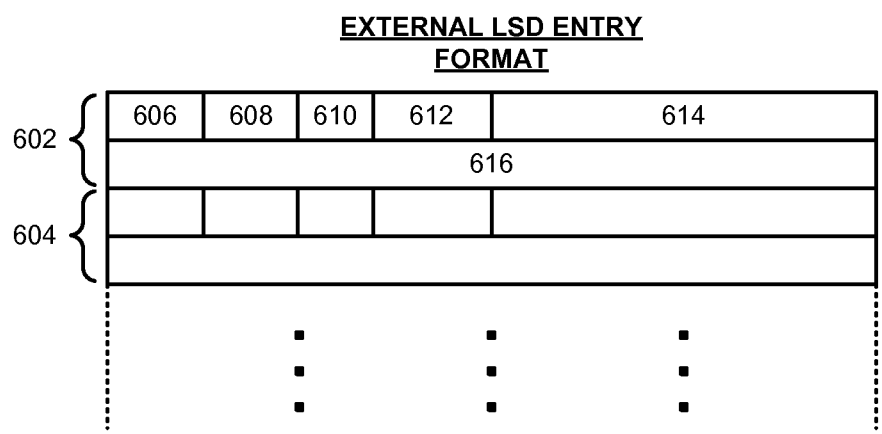
FIG. 6 illustrates external LSD entries in accordance with an embodiment of the present invention.

FIG. 6 illustrates external LSD entries in accordance with an embodiment of the present invention.

A message can include one or more external LSD entries. An external LSD entry is associated with an external link, i.e., a link that is outside the network. For example, a message can include external LSD entries 602 and 604. Each external LSD entry can include the following fields: entry type 606, reserved field 608, address type 610, metric 612, node identifier 614, and network address and mask 616. Entry type 606 can indicate that this LSD entry is an external LSD entry. Reserved field 608 can be reserved for future purposes.

Network address and mask 616 can include the network address and the mask which is associated with the advertised network. Address type 610 can indicate the type of address that is included in network address and mask 616. Specifically, address type 610 can indicate whether network address and mask 616 contains a network address with a prefix length of 32, or whether network address and mask 616 has the network address and prefix length encoded. The network address and prefix length can be encoded as follows: network prefix followed by a "0" followed by "1s." For example, for external network 10.10.1.32/27, address type 610 can indicate that network address and mask 616 contains the network address and prefix length encoded, and the network address and mask 616 can be encoded as "00001010.00001010. 000000 01.00101111." On the other hand, for external network 10.10.1.32/32, the address type 610 can indicate that network address and mask 616 contains a network address with a prefix length of 32, and network address and mask 616 can be encoded as "00001010.00001010. 00000001. 00100000."

Metric 612 can be associated with the network that is being advertised in the external LSD entry. Specifically, metric 612 can be used by a shortest path algorithm to determine shortest paths to advertised networks. Node identifier 614 can be the identifier of the node which is advertising the external network as being reachable via an external link.

A Process for Exchanging Routine Information

Figure 7:
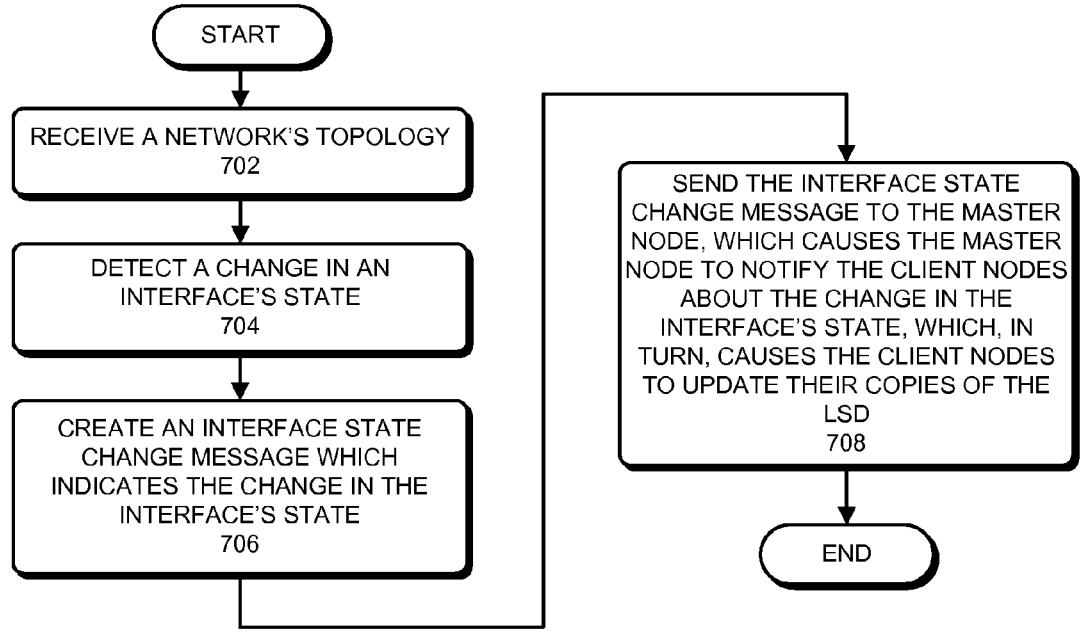
FIG. 7 presents a flowchart that illustrates how a client node can exchange routing information with a master node in accordance with an embodiment of the present invention.

FIG. 7 presents a flowchart that illustrates how a client node can exchange routing information with a master node in accordance with an embodiment of the present invention.

A client node can receive a network's topology (step 702). For example, the network's topology may be stored in a configuration file that is accessible to the client node, and the client node may read the configuration file during boot-up. In one embodiment, network nodes do not learn the network's topology by performing network discovery. The network's topology can include information about how links and nodes in the network are coupled together. In one embodiment, the network's topology does not include state information of links and nodes in the network.

The network can include at least one master node and at least one client node. The master node can maintain an LSD, and the client nodes can store copies of the LSD. The client nodes can receive LSD update messages from the master node which can enable the client nodes to update their copies of the LSD. An LSD message can be contained in a single UDP packet, and the master node can use IPv4 or IPv6 multicasting to send the LSD update messages to the client nodes. The client nodes can use their copies of the LSD to determine forwarding tables.

Next, the client node can detect a change in an interface's state (step 704). The client node can then create an interface-state-change message which indicates the change in the interface's state (step 706). An interface at a node can be associated with an internal link or an external link. For example, if an interface at a node is coupled with another node in the network, the interface may be associated with an internal link. On the other hand, if the interface is coupled with an external node, the interface may be associated with an external link.

Next, the client node can send the interface-state-change message to the master node, which can cause the master node to notify the client nodes about the change in the interface's state, which, in turn, can cause the client nodes to update their copies of the LSD (step 708).

All nodes in the network can include one or more interfaces which are dedicated for sending and receiving control messages, thereby creating a separate control network for carrying control traffic. If a client node detects that the master node is down, the client node can flush its forwarding table and start dropping traffic.

If a client node's copy of the LSD is out of sync with the master node's LSD, the client node can request the master node to send a full LSD update message to the client node. The full LSD update message can include information about only those links that are down, and the links whose information is not included in the full LSD update message can be assumed to be up.

Figure 8:
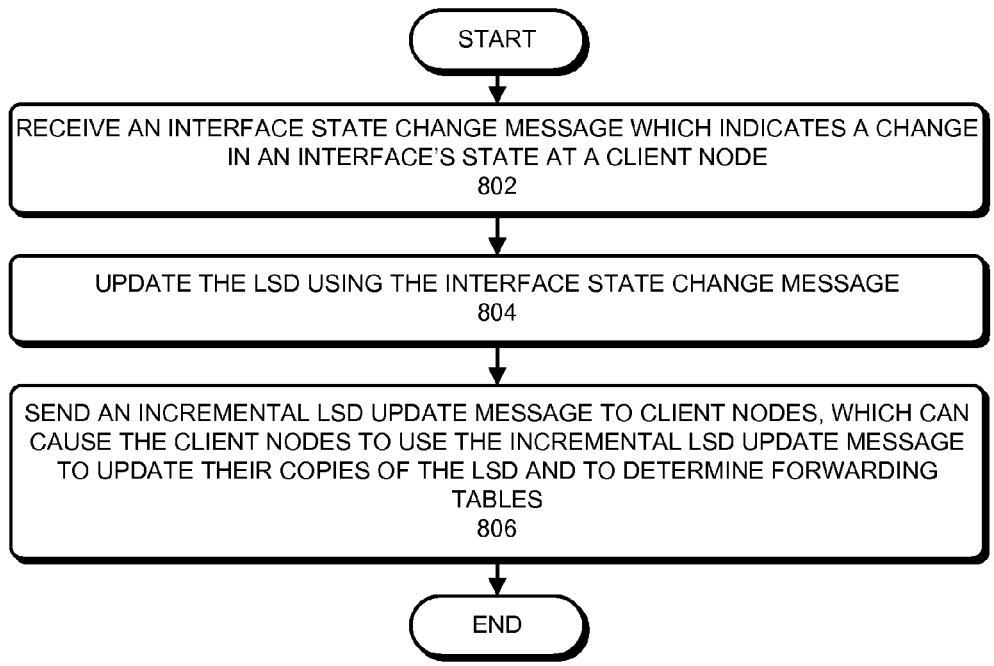
FIG. 8 presents a flowchart that illustrates how a master node can exchange routing information with a client node in accordance with an embodiment of the present invention.

FIG. 8 presents a flowchart that illustrates how a master node can exchange routing information with a client node in accordance with an embodiment of the present invention.

The master node can receive an interface-state-change message which indicates a change in an interface's state at a client node (step 802). The master node can start an LSD update timer (if it is not currently running) when it receives the interface-state-change message.

Next, the master node can update the LSD using the interface-state-change message (step 804).

The master node can then send an incremental LSD update message to client nodes, which can cause the client nodes to use the incremental LSD update message to update their copies of the LSD and to determine forwarding tables (step 806). In one embodiment, the master node can wait till the LSD update timer expires before sending the incremental LSD update message. The incremental LSD update message can act as an implicit acknowledgment for the interface-state-change message.

The master node can receive a request from a client node for a full LSD update message. Next, the master node may determine whether the full LSD update message fits in a single UDP packet. If so, the master node may send the full LSD update message to the client node in a single UDP packet. On the other hand, if the full LSD update message does not fit in a single UDP packet, the master node may not respond to the client node's request.

The master node can send a "hello" message to the client nodes, wherein the "hello" message includes the LSD's version number and the LSD's checksum. In addition to identifying dead client nodes, the hello messages can help the client nodes to determine whether their copies of the LSD are in sync with the master node's LSD.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions that when executed by a computer cause the computer to perform a method for exchanging routing information, the method comprising:
   receiving, by a master node in a network having at least one master node and a plurality of client nodes which are each separate routing entities, a first interface state change message from a first client node, the first interface state change message indicating a change in an interface associated with the first client node;
   starting, by the master node responsive to receiving the first interface state change message, a link state database (LSD) update timer having a predetermined time interval;
   receiving, by the master node, one or more additional interface state change messages from the plurality of client nodes during the predetermined time interval;
   responsive to a determination that the LSD update timer has expired, updating, by the master node, an LSD based on the first interface state change message and the one or more additional received interface state change messages; and
   transmitting, by the master node to each client node of the plurality of client nodes, an LSD update message, wherein the LSD update message causes each client node of the plurality of client nodes to update a respective copy of the link state database.

2. The non-transitory computer-readable storage medium of claim 1, wherein the LSD update message is included in a UDP (User Datagram Protocol) packet which is received using multicasting.

3. The non-transitory computer-readable storage medium of claim 1, wherein each node in the network includes one or more interfaces which are dedicated for sending and receiving control messages, thereby creating a separate control network for carrying control traffic.

4. The non-transitory computer-readable storage medium of claim 1,
   wherein the network's topology includes information about how links and nodes in the network are coupled together;
   wherein the network's topology does not include state information of links and nodes in the network; and
   wherein network nodes do not learn the network's topology by performing network discovery.

5. The non-transitory computer-readable storage medium of claim 1, wherein if the first client node detects that the master node is down, the first client node flushes its forwarding table and starts dropping traffic.

6. The non-transitory computer-readable storage medium of claim 1,
   wherein if the first client node's copy of the LSD is out of sync with the master node's LSD, the first client node requests the master node to send a full LSD update message to the first client node;
   wherein the full LSD update message includes information about only those links that are down; and
   wherein links whose information is not included in the full LSD update message are assumed to be up.

7. A non-transitory computer-readable storage medium storing instructions that when executed by a computer cause the computer to perform a method for exchanging routing information, the method comprising:
   receiving by a master node in a network having at least one master node and a plurality of client nodes which are each separate routing entities, a first interface state change message from a first client node, the first interface state change message indicating a change in an interface associated with the first client node;
   starting, by the master node responsive to receiving the first interface state change message, a link state database (LSD) update timer having a predetermined time interval;
   receiving, by the master node, one or more additional interface state change messages from the plurality of client nodes during the predetermined time interval;
   responsive to a determination that the LSD update timer has expired, updating, by the master node, a copy of the LSD maintained by the master node based on the first interface state change message and the one or more additional received interface state change messages; and
   sending, by the master node to each client node of the plurality of client nodes, an incremental LSD update message to, wherein the LSD update message causes each client node of the plurality of client nodes to use the incremental LSD update message to update a respective copy of the LSD and to determine forwarding tables.

8. The non-transitory computer-readable storage medium of claim 7, wherein the incremental LSD update message acts as an implicit acknowledgment for the first interface-state-change message.

9. The non-transitory computer-readable storage medium of claim 7, wherein the method comprises:
   receiving, by the master node, a request from the first client node for a full LSD update message, wherein the full LSD update message includes information about only those links that are down, and wherein links whose information is not included in the full LSD update message are assumed to be up;
   determining, by the master node, whether the full LSD update message fits in a single UDP (User Datagram Protocol) packet;
   sending, by the master node to the first client node, the full LSD update message in a single UDP packet in response to a determination that the full LSD update message fits in a single UDP packet; and
   not sending, by the master node to the first client node, the full LSD update message to the first client node, in response to a determination that the full LSD update message does not fit in a single UDP packet.

10. The non-transitory computer-readable storage medium of claim 7, wherein the method further comprises sending a "hello" message to each client node of the plurality of client nodes, wherein the "hello" message includes the LSD's version number and the LSD's checksum, wherein sending the "hello" message causes the client nodes to determine whether their copies of the LSD are in sync with the master node's LSD.

11. A method for exchanging routing information, comprising:
receiving, by a master node in a network having at least one master node and a plurality of client nodes which are each separate routing entities, a first interface state change message from a first client node, the first interface state change message indicating a change in an interface associated with the first client node;
starting, by the master node responsive to receiving the first interface state change message, a link state database (LSD) update timer having a predetermined time interval;
receiving, by the master node, one or more additional interface state change messages from the plurality of client nodes during the predetermined time interval;
responsive to a determination that the LSD update timer has expired, updating, by the master node responsive to the interface state change message, an LSD based on the first interface state change message and the one or more additional received interface state change messages; and
transmitting, by the master node to each client node of the plurality of client nodes, an LSD update message, wherein the LSD update message causes each client node of the plurality of client nodes to update a respective copy of the link state database.

12. The method of claim 11, wherein the LSD update message is included in a UDP (User Datagram Protocol) packet which is received using multicasting.

13. The method of claim 11, wherein each node in the network includes one or more interfaces which are dedicated for sending and receiving control messages, thereby creating a separate control network for carrying control traffic.

14. The method of claim 11,
wherein the network's topology includes information about how links and nodes in the network are coupled together;
wherein the network's topology does not include state information of links and nodes in the network; and
wherein network nodes do not learn the network's topology by performing network discovery.

15. The method of claim 11, wherein if the first client node detects that the master node is down, the first client node flushes its forwarding table and starts dropping traffic.

16. The method of claim 11,
wherein if the first client node's copy of the LSD is out of sync with the master node's LSD, the first client node requests the master node to send a full LSD update message to the first client node;
wherein the full LSD update message includes information about only those links that are down; and
wherein links whose information is not included in the full LSD update message are assumed to be up.

17. A method for exchanging routing information, comprising:
receiving by a master node in a network having at least one master node and a plurality of client nodes which are each separate routing entities, a first interface state change message from a first client node, the first interface state change message indicating a change in an interface associated with the first client node;
starting, by the master node responsive to receiving the first interface state change message, a link state database (LSD) update timer having a predetermined time interval;
receiving, by the master node, one or more additional interface state change messages from the plurality of client nodes during the predetermined time interval;
responsive to a determination that the LSD update timer has expired, updating, by the master node, a copy of the LSD maintained by the master node based on the first interface state change message and the one or more additional received interface state change messages; and
sending, by the master node to each client node of the plurality of client nodes, an incremental LSD update message to, wherein the LSD update message causes each client node of the plurality of client nodes to use the incremental LSD update message to update a respective copy of the LSD and to determine forwarding tables.

18. The method of claim 17, wherein the incremental LSD update message acts as an implicit acknowledgment for the first interface-state-change message.

19. The method of claim 17, further comprising:
receiving, by the master node, a request from the first client node for a full LSD update message, wherein the full LSD update message includes information about only those links that are down, and wherein links whose information is not included in the full LSD update message are assumed to be up;
determining, by master node, whether the full LSD update message fits in a single UDP (User Datagram Protocol) packet;
sending, by the master node to the first client node, the full LSD update message in a single UDP packet in response to a determination that the full LSD update message fits in a single UDP packet; and
not sending, by the master node to the first client node, the full LSD update message to the first client node, in response to a determination that the full LSD update message does not fit in a single UDP packet.

20. The method of claim 17, further comprising sending a "hello" message to each client node of the plurality of client nodes, wherein the "hello" message includes the LSD's version number and the LSD's checksum, wherein sending the "hello" message causes the client nodes to determine whether their copies of the LSD are in sync with the master node's LSD.

\* \* \* \* \*